United States Patent
Kim et al.

(10) Patent No.: US 9,516,602 B2
(45) Date of Patent: Dec. 6, 2016

(54) APPARATUS AND METHOD FOR ADAPTIVE TRANSMISSION POWER NORMALIZATION IN WIRELESS COMMUNICATION SYSTEM

(71) Applicant: Samsung Electronics Co., Ltd., Suwon-si, Gyeonggi-do (KR)

(72) Inventors: Chan-Hong Kim, Hwaseong-si (KR); Tae-Young Kim, Seongnam-si (KR); Ji-Yun Seol, Seongnam-si (KR); Jae-Seung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/908,254

(22) PCT Filed: Jul. 29, 2014

(86) PCT No.: PCT/KR2014/006950
§ 371 (c)(1),
(2) Date: Jan. 28, 2016

(87) PCT Pub. No.: WO2015/016589
PCT Pub. Date: Feb. 5, 2015

(65) Prior Publication Data
US 2016/0192297 A1     Jun. 30, 2016

(30) Foreign Application Priority Data
Aug. 1, 2013   (KR) .......... 10-2013-0091399

(51) Int. Cl.
*H04B 1/00*     (2006.01)
*H04W 52/18*    (2009.01)
(Continued)

(52) U.S. Cl.
CPC ........... *H04W 52/18* (2013.01); *H04B 7/0426* (2013.01); *H04B 7/0456* (2013.01);
(Continued)

(58) Field of Classification Search
CPC ... H04B 7/0617; H04B 7/0417; H04B 7/0413; H04B 7/0452; H04B 7/0456; H04B 7/0626; H04B 10/116; H04B 7/0408; H04B 7/0639; H04B 15/00; H04B 17/318; H04B 1/71072; H04B 7/024; H04B 7/0486
(Continued)

(56) References Cited

U.S. PATENT DOCUMENTS

2012/0314678 A1* 12/2012 Ko ................... H04L 5/0053
                                                      370/329

FOREIGN PATENT DOCUMENTS

KR   10-2014-0012240 A    2/2014

OTHER PUBLICATIONS

Zheng et al; Generic Optimization of Linear Precoding in Multibeam Satellite Systems; IEEE; Jun. 2012.
(Continued)

*Primary Examiner* — Tu X Nguyen
(74) *Attorney, Agent, or Firm* — Jefferson IP Law, LLP

(57) ABSTRACT

A transmission normalization in a wireless communication system adopting hybrid beamforming is provided. An operating method of a transmitter includes transmitting control information on transmission power normalization, receiving information indicating a precoding matrix and an analog beam selected based on the control information, and transmitting a signal normalized using a normalization coefficient corresponding a combination of the precoding matrix and the analog beam.

20 Claims, 11 Drawing Sheets

(51) Int. Cl.
    *H04W 52/42*     (2009.01)
    *H04B 17/318*     (2015.01)
    *H04B 7/04*     (2006.01)
    *H04B 7/06*     (2006.01)

(52) U.S. Cl.
    CPC ......... *H04B 7/0617* (2013.01); *H04B 7/0639* (2013.01); *H04B 7/0665* (2013.01); *H04B 17/318* (2015.01); *H04W 52/42* (2013.01)

(58) Field of Classification Search
    USPC .................................. 455/25, 63.4, 511, 513
    See application file for complete search history.

(56) References Cited

OTHER PUBLICATIONS

Lim et al; Recent Trend of Multiuser MIMO in LTE-Advanced; IEEE; Nov. 2012.
Lee et al; Network Massive MIMO for Cell-Boundary Users: From a Precoding Normalization Perspective; IEEE; Dec. 2012.

\* cited by examiner

| 411 | 412 |
|---|---|
| PMI#1 / BI#1 | <FLAG> |
| ⋮ | ⋮ |
| PMI#n / BI#m | <FLAG> |
| ⋮ | ⋮ |

A

| 421 | 422 |
|---|---|
| BI#1 | <BEAM COEFFICIENT> |
| ⋮ | ⋮ |
| BI#M | <BEAM COEFFICIENT> |
| ⋮ | ⋮ |

| 711 | 712 | 713 |
|---|---|---|
| PMI#1 / BI#1 | <FLAG> | <OFFSET> |
| ... | ... | ... |
| PMI#n / BI#m | <FLAG> | <OFFSET> |
| ... | ... | ... |

A

| 721 | 722 |
|---|---|
| BI#1 | <BEAM COEFFICIENT> |
| ... | ... |
| BI#M | <BEAM COEFFICIENT> |
| ... | ... |

B

| 731 | 732 |
|---|---|
| PMI#1 / BI#1 | <FLAG> |
| ... | ... |
| PMI#n / BI#m | <FLAG> |
| ... | ... |

C

APPARATUS AND METHOD FOR ADAPTIVE TRANSMISSION POWER NORMALIZATION IN WIRELESS COMMUNICATION SYSTEM

TECHNICAL FIELD

The present disclosure relates to transmission power normalization in a wireless communication system.

BACKGROUND ART

In recent, data usage over a wireless communication network is exponentially growing. Accordingly, beyond-4G mobile communication technologies are to support gigabyte communication even in the outdoors. For doing so, beamforming in a millimeter band is attracting attention as a candidate technology. The millimeter band can use a broadband, as compared to the existing lower-frequency bands. However, the millimeter band is subject to considerable channel attenuation. The beamforming has been studied to increase a signal strength in a particular direction using a plurality of antennas. As a wavelength is shortened in the high-frequency band, the multiple antennas can be integrated into a small region. Hence, the beamforming grabs the attention as a resolution for overcoming the channel attenuation of the millimeter band.

The beamforming can be implemented after a digital stage (e.g., after a baseband stage and Digital to Analog (D/A) conversion, or at a Radio Frequency (RF) stage). When the beamforming is performed at the digital stage, adjusting a beamforming coefficient (e.g., the signal strength, phase, and/or the like) is relatively easy. However, each antenna requires an RF chain leading to the baseband-D/A-RF, which complicates cost and configuration. By contrast, the beamforming at the RF stage lowers the cost but makes finely controlling the signal strength and phase relatively difficult.

Hybrid beamforming configures the baseband merely with a certain number of RF chains and connects an RF beamforming to each RF chain. Thus, the hybrid beamforming transmits multiple data via a digital precoder and obtains a beamforming gain through the RF beamformer. Thus, the hybrid beamforming can achieve an adequate trade-off, as compared to the digital beamforming and analog beamforming.

The hybrid beamforming can be combined with an Orthogonal Frequency Division Multiplexing (OFDM) system in diverse structures. For example, beamformers of the RF chains can be connected to a single physical array antenna via an adder. A Multiple Input Multiple Output (MIMO)-OFDM hybrid beamforming system can employ different digital precoders per subcarrier and different analog beamformers per RF path.

A MIMO-OFDM system according to the related art without the beamforming is subject to a high Peak-to-Average-Power Ratio (PAPR). To avoid a high PAPR, an operating point of a Power Amplifier (PA) (e.g., an average input signal strength) is lowered so that the input signal to the PA can be linearly amplified with a high probability, which is called PA back-off. In the MIMO-OFDM hybrid beamforming structure, signals as many as the RF paths are united by the adder and then input to the PA. Because the PA input signal strength can vary according to the number of the digital precoders and the RF beamformers and the transmit signal, further lowering the operating point of the PA may be necessary.

Mostly, based on hardware complexity, the same PA is used for antenna elements of the array antenna, and the back-off is fixed for the uniform transmission power in average. However, when the hybrid beamforming structure transmits the signal using multiple beams, signals are united and then input to the PA. As a result, an average transmission power input to the PA can differ according to the selected digital precoder, an analog beam combination, and the transmit signal. When such a transmission power difference is applied, a user in a particular direction receives the signal of great strength and thus a problem may arise in terms of fairness or selection criterion setting of user scheduling.

The above information is presented as background information only to assist with an understanding of the present disclosure. No determination has been made, and no assertion is made, as to whether any of the above might be applicable as prior art with regard to the present disclosure.

DISCLOSURE OF INVENTION

Solution to Problem

Aspects of the present disclosure are to address at least the above-mentioned problems and/or disadvantages and to provide at least the advantages described below. Accordingly, an aspect of the present disclosure is to provide an apparatus and a method for supporting hybrid beamforming in a wireless communication system.

Another aspect of the present disclosure is to provide an apparatus and a method for controlling a transmission power according to a Multiple Input Multiple Output (MIMO) mode in a wireless communication system.

Another aspect of the present disclosure is to provide an apparatus and a method for normalizing a transmission power which varies according to a beam combination selected in multi-beam transmission in a wireless communication system.

Another aspect of the present disclosure is to provide an apparatus and a method for providing normalization control information to a receiver in a wireless communication system.

Another aspect of the present disclosure is to provide an apparatus and a method for selecting a precoding matrix and an analog beam based on normalization control information in a wireless communication system.

In accordance with an aspect of the present disclosure, a method of a transmitter in a wireless communication system is provided. The method includes transmitting control information on transmission power normalization, receiving information indicating a precoding matrix and an analog beam selected based on the control information, and transmitting a signal normalized using a normalization coefficient corresponding to a combination of the precoding matrix and the analog beam, wherein the control information comprises information for determining the combination of the precoding matrix and the analog beam for which a transmission power of at least one antenna element exceeds a limit.

In accordance with another aspect of the present disclosure, a method for operating a receiver in a wireless communication system is provided. The method includes receiving control information on transmission power normalization, and transmitting information indicating a precoding matrix and an analog beam selected based on the control information, wherein the control information comprises information for determining the combination of the precoding and the analog beam for which a transmission power of at least one antenna element exceeds a limit.

In accordance with another aspect of the present disclosure, an apparatus of a transmitter for digital beamforming and analog beamforming in a wireless communication system is provided. The apparatus includes a transmitting unit configured to transmit control information on transmission power normalization, and a receiving unit configured to receive information indicating a precoding matrix and an analog beam selected based on the control information, wherein the transmitting unit transmits a signal normalized using a normalization coefficient corresponding to a combination of the precoding matrix and the analog beam, and the control information comprises information for determining the combination of the precoding matrix and the analog beam for which a transmission power of at least one antenna element exceeds a limit.

In accordance with another aspect of the present disclosure, an apparatus of a receiver in a wireless communication system is provided. The apparatus includes a receiving unit configured to receive control information on transmission power normalization, and a transmitting unit configured to transmit information indicating a precoding matrix and an analog beam selected based on the control information, wherein the control information comprises information for determining the combination of the precoding and the analog beam for which a transmission power of at least one antenna element exceeds a limit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIGS. 4A and 4B illustrate feedforward information in a wireless communication system according to an embodiment of the present disclosure;

FIGS. 7A, 7B, and 7C illustrate feedforward information in a wireless communication system according to an embodiment of the present disclosure;

Throughout the drawings, like reference numerals will be understood to refer to like parts, components and structures.

BEST MODE FOR CARRYING OUT THE INVENTION

Figure 1:
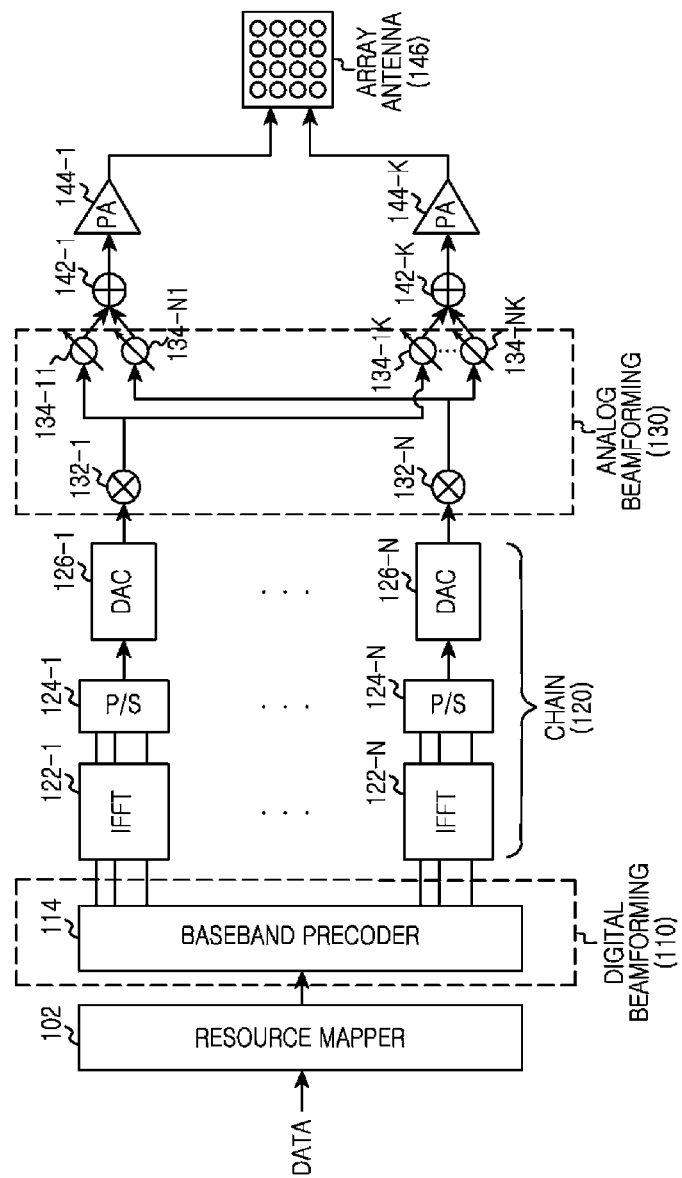
FIG. 1 illustrates a hybrid beamforming structure according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure provide a technique for normalizing a transmission power in a wireless communication system supporting hybrid beamforming. Hereinafter, an Orthogonal Frequency Division Multiplexing (OFDM)/Orthogonal Frequency Division Multiple Access (OFDMA) wireless communication system is explained by way of example.

FIG. 1 depicts a hybrid beamforming structure according to an embodiment of the present disclosure.

Referring to FIG. 1, the hybrid beamforming is performed by a resource mapper 102, a digital beamforming block 110, a chain block 120, and an analog beamforming block 130. In more detail, the digital beamforming block 110 includes a baseband precoder 114, and performs digital beamforming (e.g., precodes signals mapped to subcarriers by the resource mapper 112). The chain block 120 includes N-ary chains. Each chain includes an Inverse Fast Fourier Transform (IFFT) block 122, a Parallel to Serial (P/S) block 124, and a Digital to Analog Converter (DAC) 126. The analog beamforming block 130 includes N-ary mixers 132-1 through 132-N, Radio Frequency (RF) beamformers 134-11 through 134-NK including NK-ary phases and size conversion elements, K-ary adders 136-1 through 136-K, K-ary Power Amplifiers (PAs) 138-1 through 138-K, and an array antenna 140 including K-ary signal radiating elements. The hybrid beamforming structure of FIG. 1 can be implemented variously.

As illustrated in FIG. 1, the hybrid beamforming can be combined with OFDM transmission. Referring to FIG. 1, the RF beamformers 134-11 through 134-NK of the chains 120 can be connected to the single physical array antenna 140 via the adders 136-1 through 136-K. The N-ary chains each can form a different analog beam, and the MIMO according to the related art such as diversity and spatial multiplexing can be performed through the baseband precoder 114 based on baseband. Considering the transmitted and received feedbacks, limiting a number of the precodings supported by the baseband precoder 114 and a number of the beams supported by the RF beamformers 134-11 through 134-NK in a finite number is possible. In so doing, the baseband precoder 114 can correspond to a codebook-based Preferred Matrix Index (PMI), and the RF beamformers 134-11 through 134-NK require new feedback such as Beam Index (BI).

As such, the Multiple Input Multiple Output Orthogonal Frequency Division Multiplexing (MIMO-OFDM) hybrid beamforming structure is subject to the greater Peak-to-Average-Power Ratio (PAPR) problem than a MIMO-OFDM structure according to the related art. More specifically, the MIMO-OFDM hybrid beamforming structure has the similar PAPR to the MIMO-OFDM system according to the related art. However, because the multiple signals are combined and then input to the PA, the average power of the signals input to the PA is not constant and a dynamic range of the input signal strength is wider. Thus, an additional back-off should be considered.

The back-off is explained now.

The PA, which is one of RF elements, amplifies the strength of the input signal. To maintain orthogonality per subcarrier of the OFDM signal, the input signal needs to be linearly amplified. However, the PA cannot further linearly amplify the input signal strength over a certain level. For example, the PA for amplifying the signal magnitude 10 times amplifies the signal of 2 to the signal of 20 and the signal of 3 to the signal of 30, but amplifies only to the signal of 20 due to the physical limitation. In this case, the PA amplifies the input signal of 3 to the signal of 20 (e.g., the output is saturated).

In the OFDM system, the PAPR increases in proportion to the number of the subcarriers. When a peak input signal is set to a saturation point of the PA output, other signals are always at a lower input level than the peak. Thus, the PA output can be linear. Instead of setting the average input signal strength of the PA to the saturation point of the output (e.g., to the input signal strength corresponding to the peak point) so as to maintain the linearity between the PA input and output signals based on the high PAPR of the OFDM, the average input signal strength of the PA can be controlled at a quite low point based on the PAPR of the OFDM. Such control of the average input signal strength of the PA is referred to as the back-off of the PA and a degree thereof is referred to as a back-off amount.

To send the signal of the low PAPR, the operating point of the average input signal strength of the PA can be increased. The increase of the average input signal strength of the PA increases the transmission power and thus enhances efficiency of the PA. However, the OFDM signal of the considerable PAPR is given the back-off ranging from 7 to 10 dB. The MIMO-OFDM includes the PA in each antenna, and the power thereof can increase or reduce in some cases unless the average power of the PA input signals are uniform. Hence, the dynamic range of the PA input signal strength can expand. To maintain the linearity of the PA input and output signals, matching to the peak maximum output operating point of the dynamic range may be necessary. Thus, the back-off amount increases.

In result, the PA efficiency is compromised. Hence, designing the digital precoder (e.g., the codebook with a constant modulus property) so that the same average power signal can be input to the PA of the antennas regardless of the MIMO mode may be advantageous.

The present hybrid beamforming MIMO-OFDM system adds the analog beamforming of the RF block of the MIMO-OFDM system and thus combines the signals input to the PA corresponding to the antenna elements after the beamforming. Hence, even when the digital precoder is designed with the constant modulus property, the average power of the signals multiplied by an analog beamforming coefficient is uniform but the sum of two or more signals by the adder can further increase or decrease in size according to the signal phase. Eventually, the average power of the input signals of the PAs after the addition can differ per PA, and the dynamic range of the signal level is proportional to the number of the added signals (e.g., the number of the RF chains). Hence, the back-off amount of the PA of the hybrid beamforming MIMO-OFDM system which adds the digital beamformed signals should consider not only the MIMO-OFDM system according to the related art but also the number of the RF chains.

As above, additional back-off in the hybrid beamforming structure besides the PAPR of the OFDM needs to be determined by considering all MIMO modes of the system. When the back-off size is determined against the greatest signal strength in a particular antenna element, additional back-off size can be pre-calculated with the limited combination of the digital precoder and the RF beamformer.

However, even when the additional PA back-off is considered, the PA linearity can be lost in a particular MIMO mode, for example, in a rank-1 MIMO diversity mode, namely, a single stream multi-beam transmission mode of the MIMO modes, to be explained.

In the single stream multi-beam transmission mode, the signal strength of the particular antenna element can notably increase, to be explained in more detail.

In the single stream multi-beam transmission, the range of the transmission power of the particular antenna element is given by Equation 1.

$$0 \le \left| \sum_{i=0}^{N_{RF}-1} p_i w_{mb_i} \right|^2 \le \frac{N_{RF}}{N_t} \quad \text{Equation (1)}$$

In Equation 1, $N_{RF}$ denotes the number of the chains of the transmitter, $p_i$ denotes the digital precoding coefficient corresponding to the i-th transmitter chain, $w_{mb_i}$ denotes a value corresponding to the m-th antenna of the analog beam coefficient corresponding to the i-th transmitter chain, and $N_t$ denotes the number of the transmitter antenna elements.

When a condition of Equation 2 is satisfied, the transmission power of the particular antenna element is maximized.

$$p_0 w_{mb_0} = p_1 w_{mb_1} = \ldots = p_{N_{RP}-1} w_{mb_{N\,RF-1}} \quad \text{Equation (2)}$$

In Equation 2, denotes the digital precoding coefficient corresponding to the i-th transmitter chain $w_{mb_i}$ denotes the value corresponding to the m-th antenna of the analog beam coefficient corresponding to the i-th transmitter chain, and $N_{RF}$ denotes the number of the chains of the transmitter.

The maximized transmission power of the particular antenna element can be given by Equation 3.

$$P_{m,max} = \left| \frac{N_{RF}}{\sqrt{N_{RF} N_t}} e^{j\theta} \right|^2 = \frac{N_{RF}}{N_t} \quad \text{Equation (3)}$$

In Equation 3, $P_{m,\,max}$ denotes the maximum transmission power of the m-th antenna element, $N_{RF}$ denotes the number of the transmitter chains, and $N_t$ denotes the number of the transmitter antenna elements.

For example, the maximum transmission power of the particular antenna element depends on the number of the RF chains as expressed in Equation 3, and this implies that the signal addition expands the dynamic range of the input signal compared to the MIMO-OFDM system according to the related art. Determining the back-off amount by taking into account the increased range of the signal level may be necessary.

The total transmission power can be given by Equation 4.

$$0 \le P_{tot} = \sum_{m=0}^{N_t-1} \left| \sum_{i=0}^{N_{RF}-1} p_i w_{mb_i} \right|^2 \le N_{RF} \quad \text{Equation (4)}$$

In Equation 4, $P_{tot}$ denotes the total transmission power, denotes the number of the transmitter antenna elements, $N_{RF}$ denotes the number of the chains of the transmitter, $p_i$ denotes the digital precoding coefficient corresponding to the i-th transmitter chain, and $w_{mb_i}$ denotes the value corresponding to the m-th antenna of the analog beam coefficient corresponding to the i-th transmitter chain.

Because the overall average power of the signals input to the PAs are not uniform as expressed in Equation 4, the normalization of the overall average power is more required.

When the maximum transmission powers of the antenna elements arise at the same time, the total transmission power is maximized. At this time, relations between the BIs and the precoders are given by Equation 5.

$$p_0 = p_1 = \ldots = p_{N_{RF}-1} = \frac{1}{\sqrt{N_t}} \;\&\; b_0 = b_1 = \ldots = b_{N_{RF}-1} \quad \text{Equation (5)}$$

In Equation 5, $p_i$ denotes the digital precoding coefficient corresponding to the i-th transmitter chain, $N_{RF}$ denotes the number of the chains of the transmitter, $N_t$ denotes the number of the transmitter antenna elements, and $b_i$ denotes the analog beam coefficient corresponding to the i-th transmitter chain.

The single stream multi-beam transmission mode transmits the same data stream over a plurality of antennas, and the phase of the signal input to the adder relies on the digital precoder and the analog beamforming coefficient. For example, the digital precoder and the beamforming coefficient determine the average power of the PA input signal. Thus, the dynamic range of the input signal increases thanks to the signal addition of the RF stage, compared to the MIMO-OFDM system according to the related art, and accordingly the back-off amount should be increased. Further, the normalization is more required because the overall average power of the signals input to the PAs is not uniform.

In the MIMO mode of the rank over 2, the average power of the PA input signal depends on not only the digital precoder and the analog beam combination but also the transmit signal. Hence, the average transmission power of the input signal of the PA is mostly uniform on account of the addition of the random transmit signals, as compared to the rank-1 diversity mode. For example, in the rank over 2, the total transmission power (e.g., the sum of the powers of the PA output signals) is naturally normalized. By contrast, because the rank-1 diversity mode has the single type of the transmit signal, the total transmission power is not naturally normalized, as compared to the rank over 2. Thus, the normalization is required. The back-off amount problem of the PA arises in the process of the normalization.

For example, provided that four PAs are equipped and the powers of the input signals are 0.1, 0.2, 0.3, and 0.4, the PA efficiency degrades due to the difference of the average power of the PA input signal but the overall transmission power does not need the normalization because the total transmission power becomes 1 (=0.1+0.2+0.3+0.4). By contrast, when the present hybrid structure adopts the rank-1 diversity, the total transmission power is 0.8 with the PA powers 0.1, 0.2, 0.2, and 0.1 and is 1.2 with 0.3, 0.4, 0.2, and 0.3. When the total transmission power exceeds 1, the PA input signal can be normalized such that a normalizer of the digital stage multiplies a normalization co-efficient (e.g., 1/sqrt (1.2)) in the signal transmission. By contrast, when the total transmission power falls below 1, multiplying the normalization coefficient (e.g., 1/sqrt (0.8)) may be necessary for increasing the signal strength for the sake of the normalization. For example, because the input signal strength is to be increased, the peak may exceed the preset operating point of the PA and thus the linearity of the OFDM signal can be lost. The signal linearity loss is directly related to the system performance degradation.

To address such high transmission power in the single stream multi-beam transmission mode, increasing the back-off and normalizing the transmission power may be inevitable. However, in the single stream multi-beam transmission, a particular beam combination is subject to the greater transmission power than other beam combinations. Typically, when users are uniformly distributed in one cell, the transmission power depends on the precoder and the beam combination and thus the user scheduling may be advantageous to the users in a particular direction. Ultimately, the user fairness and the scheduler design are in trouble.

Alternatively, to address the high transmission power in the single stream multi-beam transmission, the back-off can be further increased and the transmission power can be normalized. In the transmission power normalization of the single stream multi-beam transmission, a particular antenna element is subject to the greater signal strength than the other MIMO modes. When the back-off is determined based on this and the other MIMO mode than the single stream multi-beam transmission mode is operated, the PA efficiency can be degraded.

Hence, to prevent the linearity loss of the OFDM signal due to the normalization (e.g., to prevent the PA input signal from exceeding the allowed range due to the normalization), various embodiments of the present disclosure provide a technique for blocking the total transmission power from falling below 1, to be explained.

The transmitter can control an adaptive transmission power normalization based on the MIMO mode.

Specifically, in the single stream multi-beam transmission mode, the transmitter selectively applies the normalization coefficient according to the selected digital precoder and analog beam combination. The normalization coefficient is multiplied by the signals transmitted by the chains in the normalization, and adjusts the size of the signals. The same normalization coefficient is defined for every chain, and differs according to the digital precoder and analog beam combination. Even when an arbitrary combination is selected, the normalization coefficient is determined to produce the same average transmission power. The normalization coefficient depends on the digital precoder and analog beam combination. For example, in the limited feedback environment, the normalization coefficient can be calculated and stored in advance. The normalization coefficient can be stored as a look-up table. The same PA back-off is applied to the other MIMO modes than the single stream multi-beam transmission mode. For example, the back-off size can be defined as the sum of the value considering the OFDM PAPR and $10 \log_{10} N_{RF}$ [dB].

Further, in the single stream multi-beam transmission mode, the transmitter can limit the average power per antenna element and determine whether the average power exceeds a predefined limit in the normalization. When the average power exceeds the limit, the PA can operate in a nonlinear region and thus the transmitter can switch to the other MIMO mode. For example, the other MIM mode can be a specific default MIMO mode. By contrast, when the average power falls below the limit, the transmitter can operate in the single stream multi-beam transmission mode.

Figure 2:
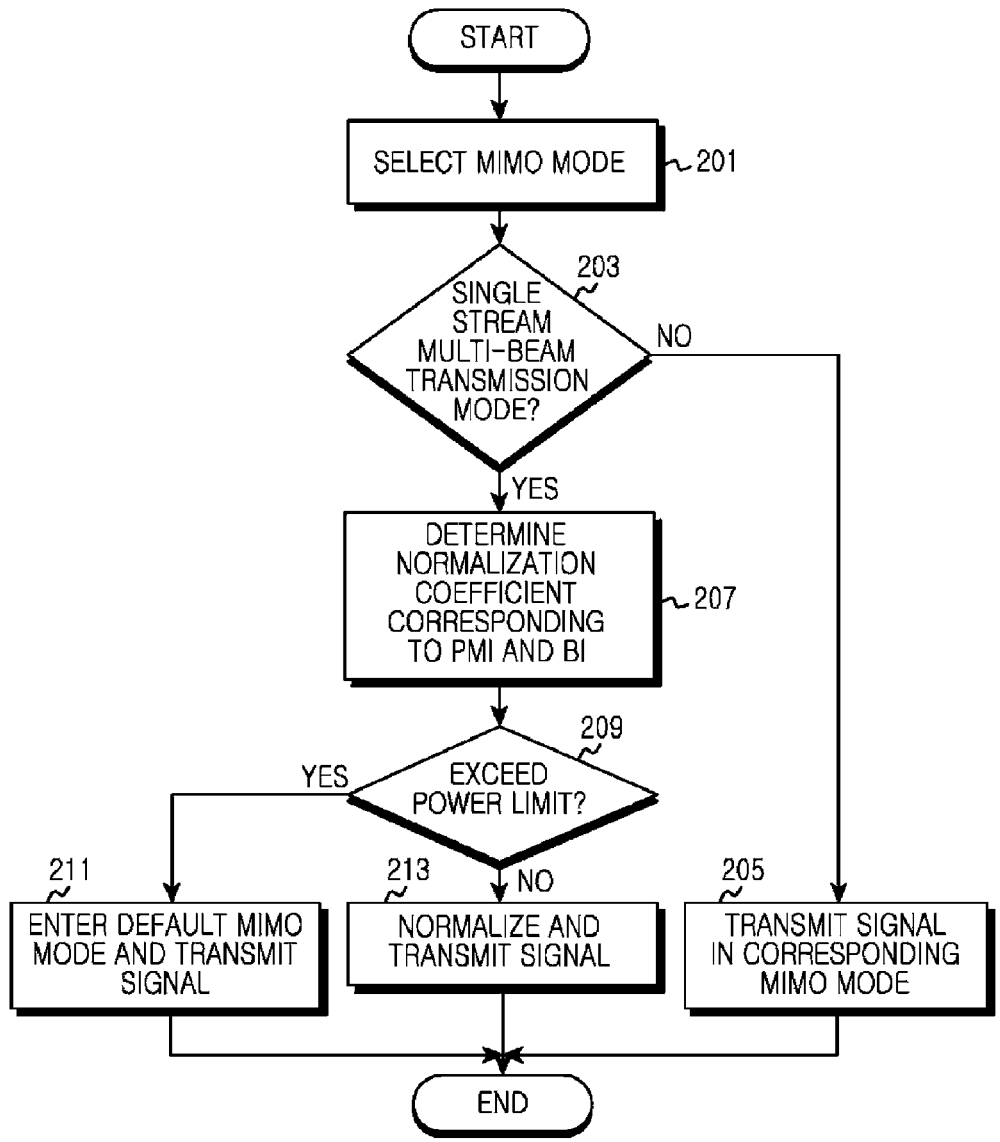
FIG. 2 illustrates operations of a transmitter in a wireless communication system according to an embodiment of the present disclosure.

FIG. 2 illustrates operations of the transmitter in the wireless communication system according to an embodiment of the present disclosure.

Referring to FIG. 2, at operation 201, the transmitter selects the MIMO mode. For example, the transmitter selects the MIMO mode for the signal transmission to the receiver. The MIMO mode can be identified with a combination of one or more items, and the items can include the number of ranks/streams, diversity/multiplexing, and Closed Loop (CL)/Open Loop (OL). The MIMO mode can be selected based on capability and channel state of the transmitter and the receiver (e.g., channel change speed, channel quality, antenna correlation, and/or the like).

At operation 203, the transmitter determines whether the selected MIMO mode is the single stream multi-beam transmission mode. For example, the transmitter determines whether the selected MIMO mode has the rank of 1 and adopts the diversity. The single stream implies that the same data is transmitted through the chains. The diversity implies that the same data is redundantly transmitted over the multiple antennas.

If the transmitter determines that the selected MIMO mode is not the single stream multi-beam transmission mode at operation 203, then the transmitter may proceed to operation 205 at which the transmitter can perform the communication in the selected MIMO mode. For example, the transmitter processes the transmit data in the selected MIMO mode, that is, performs the digital beamforming and the analog beamforming. For example, the transmitter performs the digital beamforming using an optimal PMI of the selected MIMO mode and the analog beamforming using an optimal BI. Although it is not depicted in FIG. 2, the transmitter can also determine the optimal PMI and BI with the receiver.

In contrast, if the transmitter determines that the selected MIMO mode is the single stream multi-beam transmission mode at operation 203, then the transmitter may proceed to operation 207 at which the transmitter determines the normalization coefficient corresponding to the PMI and the BI. For example, the transmitter stores a look-up table of normalization coefficients corresponding to combinations of the PMI and the BI. The transmitter can determine the normalization coefficient based on the look-up table. For example, the transmitter can calculate the normalization coefficient using the combination of the PMI and the BI according to a predefined rule.

At operation 209, the transmitter determines whether the transmission power value after the normalization exceeds the power limit. Herein, the transmission power value is the transmission power input to the PA per antenna element, and is a predicted value rather than the measured value. For example, the transmitter predictively calculates the transmission power value per antenna element after the normalization prior to the actual signal transmission, and compares the predicted transmission power value with the power limit.

If the transmitter determines that the transmission power value predicted for at least one antenna element exceeds the power limit at operation 209, then the transmitter may proceed to operation 211 at which the transmitter enters a default MIMO mode and then transmits the signal. The transmitter defines the default MIMO mode against non-communication of the selected MIMO mode. The noncommunication of the selected MIMO mode includes a case according to which the predicted transmission power value exceeds the power limit, and some other cases. Hence, the transmitter performs the digital beamforming and the analog beamforming of the transmit data in the default MIMO mode.

In contrast, if the transmitter determines that the transmission power value predicted for at least one antenna element does not exceed the power limit at operation 209, then the transmitter may proceed to operation 213 at which the transmitter normalizes the transmission power with the normalization coefficient. For example, the transmitter performs the digital beamforming using the PMI, performs the normalization by multiplying the transmit signal per chain by the normalization coefficient, and performs the analog beamforming using the BI.

Alternatively, the adaptive transmission power normalization and feedforward signaling can be carried out.

More specifically, in the single stream multi-beam transmission mode, the transmitter selectively applies the normalization coefficient according to the selected digital precoder and analog beam combination. For example, the normalization coefficient can be calculated and stored in advance. The normalization coefficient can be stored as the look-up table. The same PA back-off is applied to the other MIMO modes than the single stream multi-beam transmission mode. For example, the back-off size can be set to the sum of the value considering the OFDM PAPR and $10 \log_{10} N_{RF} [dB]$.

By contrast, for the single stream multi-beam transmission mode, the transmitter informs the receiver using feedforward that the average power of the particular antenna element can exceed the given limit in the normalization when a particular digital precoder and analog beam combination is selected. Accordingly, the receiver can feed the corresponding PMI and BI back by selecting an optimal digital precoder and analog beam combination free from the excess of the average power input to the PA over the given limit in the particular antenna element on account of the normalization. The transmitter normalizes the signal power with the normalization coefficient corresponding to the fed PMI and BI.

Now, to ease the understanding, the excess of the average power input to the PA over the given limit in the particular antenna element on account of the normalization is referred to as power excess.

Figures 3, 4:
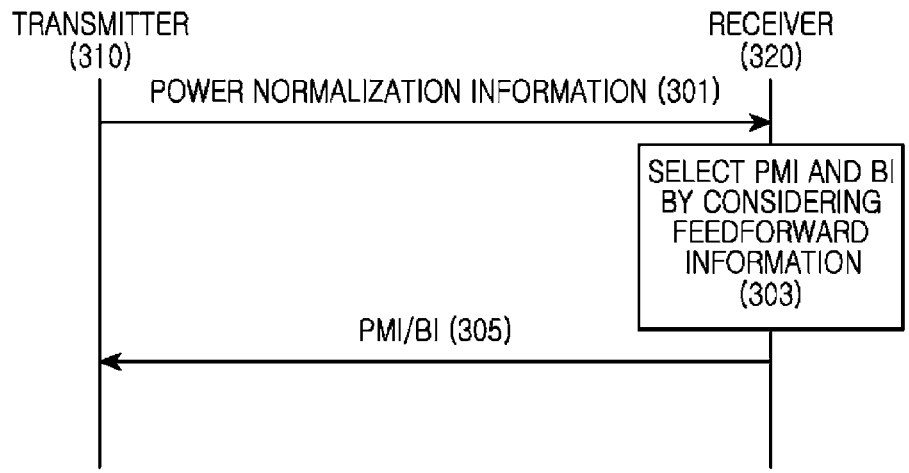
FIG. 3 illustrates signaling for power normalization in a wireless communication system according to an embodiment of the present disclosure.

FIG. 3 depicts signaling for the power normalization in a wireless communication system according to an embodiment of the present disclosure. FIGS. 4A and 4B illustrate feedforward information in a wireless communication system according to an embodiment of the present disclosure.

Referring to FIG. 3, at operation 301, a transmitter 310 transmits control information on the power normalization (e.g., feedforward information) to a receiver 320. The feedforward information can be transmitted to support the single stream multi-beam transmission mode by determining the available MIMO mode between the transmitter and the receiver at the initial cell entrance. For example, the transmitter can periodically broadcast the feedforward information.

The feedforward information includes the normalization coefficient based on the digital precoder and analog beam combination, and the power excess due to the normalization. More specifically, the feedforward information can be generated as illustrated in FIGS. 4A and 4B.

Referring to FIG. 4A, the feedforward information can include a digital precoder and analog beam combination 411, and a bitmap 412 being a set of flags indicating the power excess in the normalization with the corresponding normalization coefficient of each combination.

Referring to FIG. 4B, the feedforward information can include analog beam coefficients 422 of analog beams 421 so that the receiver can directly determine the power excess. Because the receiver is aware of precoding matrixes for the digital beamforming, the receiver receiving the analog beam coefficients 422 can predict the beamforming result of the transmitter and determine the power excess using the predicted beamforming result. When the RF beamformer changes only the phase, the analog beam coefficients 427 can include only the phase values.

At operation 303, the receiver 320 selects the PMI and the BI for the transmitter by considering the feedforward information. In so doing, the receiver 320 can select one of the PMI and BI combinations free from the power excess, based on the feedforward information. More specifically, based on the feedforward information of FIG. 4A, the receiver 320 can exclude the PMI and BI combination causing the power excess by referring to the bitmap 412, and then select the PMI and the BI for the transmitter 310. With the feedforward information of FIG. 4B, the receiver 320 can identify (e.g., determine) the PMI and BI combinations causing the power excess using the normalization coefficients and the beam coefficients, exclude the PMI and BI combinations causing the power excess, and then select the PMI and the BI for the transmitter 310.

At operation 305, the receiver 320 feeds the selected PMI and BI back to the transmitter 310. Although it is not depicted in FIG. 3, the transmitter 310 performs the digital beamforming with the fed PMI, performs the normalization by multiplying the transmit signal per chain by the normalization coefficient corresponding to the PMI and BI combination, and then performs the analog beamforming using with the BI.

Figure 5:
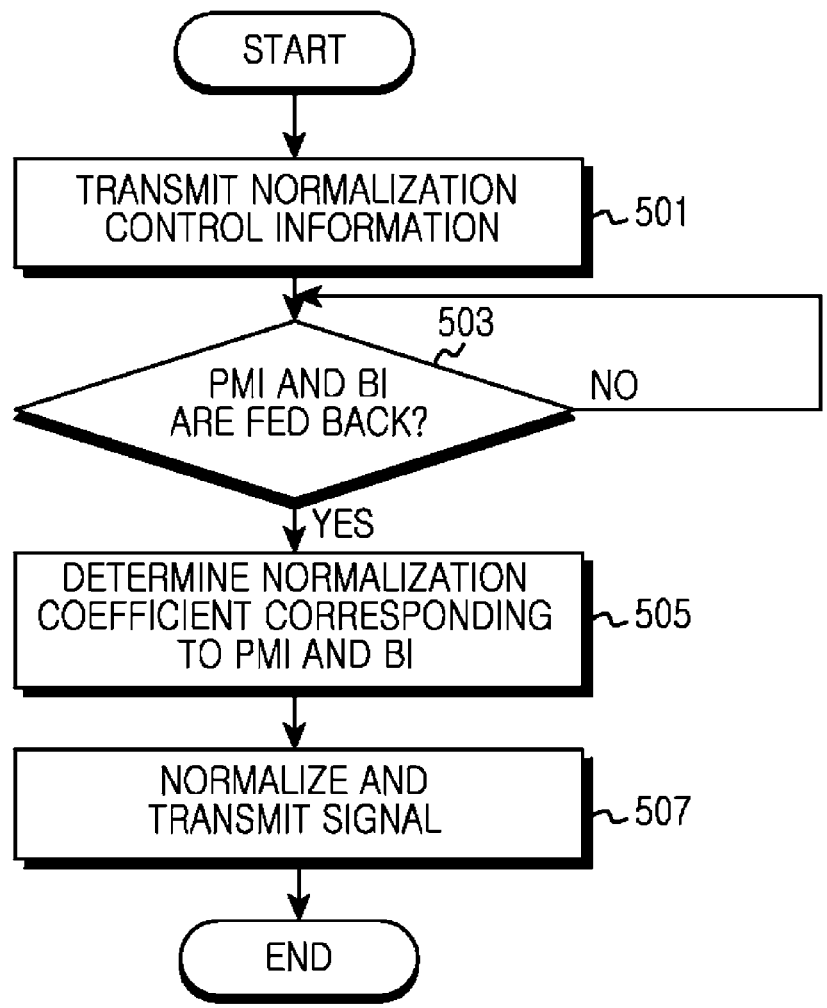
FIG. 5 illustrates operations of a transmitter in a wireless communication system according to an embodiment of the present disclosure.

FIG. 5 illustrates operations of a transmitter in a wireless communication system according to an embodiment of the present disclosure.

Referring to FIG. 5, at operation 501, the transmitter transmits the normalization control information. For example, the transmitter feedforwards the information required for the receiver to select the PMI and BI free from the power excess. The control information can include the bitmap being the set of the flags indicating the power excess in the normalization of the PMI and BI combinations with the corresponding normalization coefficient. Alternatively, the control information can include the analog beam coefficient of the analog beams.

At operation 503, the transmitter determines whether the PMI and BI are fed back from the receiver. The fed PMI and BI are selected by the receiver based on the normalization control information, and used for the precoding and the analog beamforming of the data to transmit to the receiver.

If the transmitter determines that the PMI and the BI are not fed back from the receiver at operation 503, then the transmitter may continue to poll determining whether the PMI and the BI are fed back from the receiver.

If the transmitter determines that the PMI and the BI are fed back from the receiver at operation 503, then the transmitter may proceed to operation 505 at which the transmitter determines the normalization coefficient corresponding to the PMI and the BI. For example, the transmitter stores the look-up table of the normalization coefficients corresponding to the PMI and BI combinations. The transmitter can determine the normalization coefficient based on the look-up table. For example, the transmitter can calculate the normalization coefficient using the combination of the PMI and the BI according to the predefined rule.

At operation 507, the transmitter performs the normalization. For example, the transmitter normalizes the transmission power with the normalization coefficient. For example, the transmitter performs the digital beamforming using the PMI, performs the normalization by multiplying the transmit signal per chain by the normalization coefficient, and performs the analog beamforming using the BI. The transmitter may normalize and transmit the signal.

Figure 6:
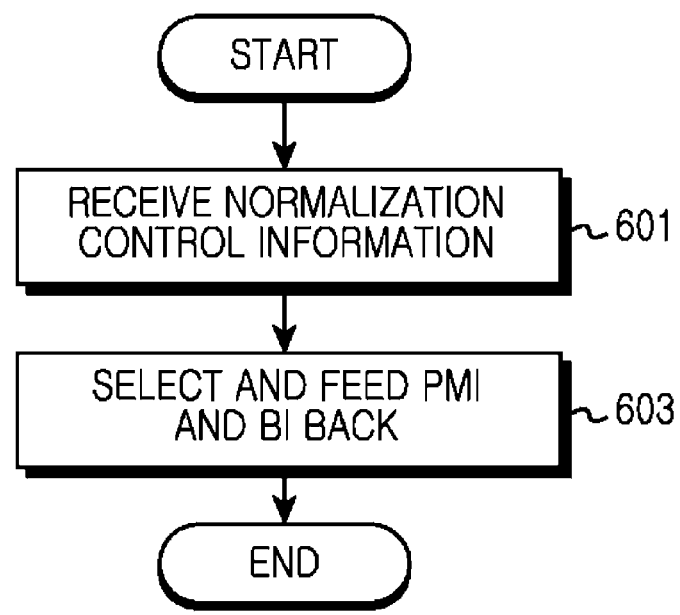
FIG. 6 illustrates operations of a receiver in a wireless communication system according to an disclosure embodiment of the present disclosure.

FIG. 6 illustrates operations of a receiver in a wireless communication system according to an embodiment of the present disclosure.

Referring to FIG. 6, at operation 601, the receiver receives the normalization control information. For example, the receiver receives the information for selecting the PMI and the BI free from the power excess. The control information can include the PMI and BI combination, and the bitmap being the set of the flags indicating the power excess in the normalization of the PMI and BI combinations with the corresponding normalization coefficient. Alternatively, the control information can include the analog beam coefficients of the analog beams.

At operation 603, the receiver selects the PMI and BI and feeds the selected PMI and BI back to the transmitter. The receiver selects one of the PMI and BI combinations free from the power excess, based on the control information. For example, the receiver can exclude the PMI and BI combination corresponding to the flag indicating the power excess, and then select the PMI and the BI for the transmitter. For example, the receiver can identify (e.g., determine) the PMI and BI combinations causing the power excess using the precoding matrix and the analog beam coefficients, exclude the PMI and BI combination causing the power excess, and then select the PMI and the BI for the transmitter.

As such, the linearity loss of the PA output can be avoided in the particular PMI and BI combination in the process of the normalization by limiting some PMI and BI combinations. However, the normalization can change the channel quality in the channel measurement for the MIMO Chanel State Information (SCI) feedback and the channel quality of the data transmission, which is to be explained.

To measure the channel between the transmitter and the receiver, the transmitter transmits a Beam Measurement Reference Signal (BM-RS). To ensure RS orthogonality between the plurality of the transmit antennas, the transmitter transmits the signal via one beam of one transmit chain over one frequency/time resource. For example, in the RS, the signal transmitted over the resource is transmitted via one particular transmit antenna, and the signals of the transmit antennas do not overlap in one resource.

In a Single Input Single Output (SISO) mode using the single chain, the data signal also includes the signal of one transmit antenna in one resource and the same channel state measured by the RS is applied. By contrast, in the MIMO mode using the multichain, an effective MIMO channel is configured by combining SISO channels according to the beam combination and accordingly the same channel measured by the RS is not applied. At this time, when the transmission power is normalized, the transmission power of the actual data transmission differs from the transmission power determined over the effective MIMO channel. For example, in the actual data transmission, the transmitter normalizes the transmission power and thus the channel quality mismatches. However, the receiver applies the beam combination and a selection metric for a Modulation and Coding Scheme (MCS) level based on the unnormalized transmission power and thus the optimal beam combination and MCS level may not be selected.

To address the channel quality mismatch, various embodiments of the present disclosure provide an additional process as follows.

FIGS. 7A, 7B, and 7C illustrate feedforward information in a wireless communication system according to an embodiment of the present disclosure.

In the feedforward information feedforwarded from the transmitter to the receiver as shown in FIG. 3, the transmitter further includes an offset for the channel quality mismatch. In this case, the feedforward information can be generated as shown in FIG. 7A. Referring to FIG. 7A, the feedforward information can include a digital precoder and analog beam combination 711, a bitmap 712 indicating the power excess when the combinations are normalized with the corresponding normalization coefficient, and an offset 713 for compensation. The bitmap can be $\{\log_2 ((\text{number of base station beams})^{(numver\ od\ chains)} \times (\text{number of PMIs}))\}$ bits. The bitmap 712 includes flags of the combinations. For example, the flag 'on' implies that the digital precoder and analog beam combination is limited in the feedback (e.g., is forbidden for use). The offset 713 indicates increment or decrement of the transmission power on account of the normalization. The offset 713 can be $\{(\text{the number of bitmap } 712 - \text{the number of combinations of the limited feedback}) \times (\text{quntization bit representing offset } 713)\}$ bits.

Accordingly, based on the bitmap 713, the receiver can exclude the PMI and BI combination causing the power excess. Further, the receiver can determine the CSI considering the channel quality mismatch by compensating for the channel quality using the offset 713. As a result, the receiver can select the PMI and BI combination based on the CSI considering the channel mismatch, and compensate for Channel Quality Information (CQI) to feed back to the transmitter. Herein, the CQI can employ a channel quality value or the MCS level determined based on the channel quality value.

Alternatively, the transmitter can feedforward the transmit beam coefficients to the receiver. In this case, the feedforward information can be configured as shown in FIG. 7B. Referring to FIG. 7B, the feedforward information can include analog beam coefficients 722 of the analog beams 721 so that the receiver can directly determine the power excess and the offset. When the RF beamformer changes only the phase, the analog beam coefficients 722 can include only the phase values. For example, in the array antenna of a particular pattern such as Uniform Linear Array (ULA), the beam coefficient 722 can include only transmit angles.

Hence, the receiver can identify (e.g., determine) the PMI and BI combination causing the power excess using the transmit beam coefficients. Further, the receiver can calculate the offsets of the channel quality of the available PMI and BI combination. Accordingly, the receiver can determine the CSI considering the channel quality mismatch by compensating for the channel quality with the offset. As a result, the receiver can select the PMI and BI combination based on the CSI of the channel mismatch and compensate for the CQI to feed back to the transmitter. Herein, the CQI can employ the channel quality value or the MCS level determined based on the channel quality.

Alternatively, the transmitter can compensate for the offset. In this case, the feedforward information can be configured as shown in FIG. 7C. Referring to FIG. 7C, the feedforward information can include a digital precoder and analog beam combination 731, and a bitmap 732 indicating the power excess when the combinations are normalized with the corresponding normalization coefficient. The offset of FIG. 7A is excluded in FIG. 7C.

Hence, the receiver can exclude the PMI and BI combination causing the power excess, based on the bitmap 713. However, because the offset is excluded, the receiver cannot determine the CSI considering the channel quality mismatch. Thus, the transmitter compensates for the CQI. The transmitter compensates for the CQI fed back from the receiver and notify the compensated CQI to the receiver. For example, the CQI can employ a maximum MCS level. More specifically, the transmitter can redetermine the MCS level to apply to the data to transmit to the receiver by taking into account the difference between the transmission power corresponding to the fed BI and PMI combination and the normalized value. The receiver recognizes the change of the MCS level over a downlink control channel, and demodulates and decodes the data signal at the changed MCS level.

With the feedforward information of FIG. 7A, the transmitter operates as follows.

The operations of the transmitter are similar to the operations of FIG. 5. For example, the transmitter transmits the normalization control information including the bitmap being the set of the flags indicating the power excess when the PMI and BI combinations are normalized with the corresponding normalization coefficient, and the offsets for compensating for the channel quality mismatch. When receiving the PMI and the BI from the receiver, the transmitter determines the normalization coefficient corresponding to the PMI and the BI, and then performs the normalization.

With the feedforward information of FIG. 7A, the receiver operates as follows.

Figure 8:
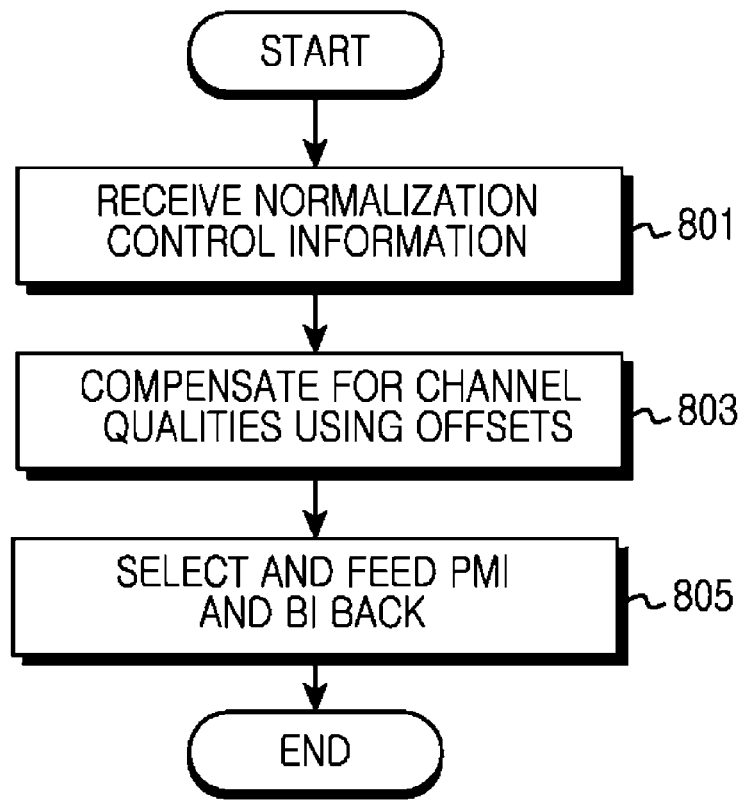
FIG. 8 illustrates operations of a receiver in a wireless communication system according to an embodiment of the present disclosure.

FIG. 8 illustrates operations of a receiver in a wireless communication system according to an embodiment of the present disclosure.

Referring to FIG. 8, at operation 801, the receiver receives the normalization control information. For example, the receiver receives the information for selecting the PMI and the BI free from the power excess, and the information for compensating for the channel quality mismatch caused by the normalization. The control information can include the PMI and BI combination, the bitmap being the set of the flags indicating the power excess in the normalization of the PMI and BI combinations, and the offsets for compensating for the channel quality mismatch.

At operation 803, the receiver compensates for the channel qualities of the data transmission with the PMI and BI combination using the offsets. For example, the receiver determines the channel quality of the actual data transmission by adding or subtracting the offsets to or from the channel quality of the PMI and BI combination based on the effective channel measured using the RS.

At operation 805, the receiver selects the PMI and the BI and feeds the selected PMI and BI back to the transmitter. The receiver selects the PMI and the BI free from the power excess, based on the control information. For example, the receiver can exclude the PMI and BI combination corresponding to the flag causing the power excess, and then select the PMI and the BI for the transmitter.

Although it is not illustrated in FIG. 8, the receiver can compensate for the CQI fed back to the transmitter, with the offset, and then feed the compensated CQI. Herein, the CQI can employ the channel quality value or the MCS level determined based on the channel quality.

With the feedforward information of FIG. 7B, the transmitter operates as follows.

The operations of the transmitter are similar to the operations of FIG. 5. For example, the transmitter transmits the normalization control information including the analog transmit beam coefficients. When receiving the PMI and the BI from the receiver, the transmitter determines the normalization coefficient corresponding to the PMI and the BI, and then performs the normalization.

With the feedforward information of FIG. 7B, the receiver operates as follows.

Figure 9:
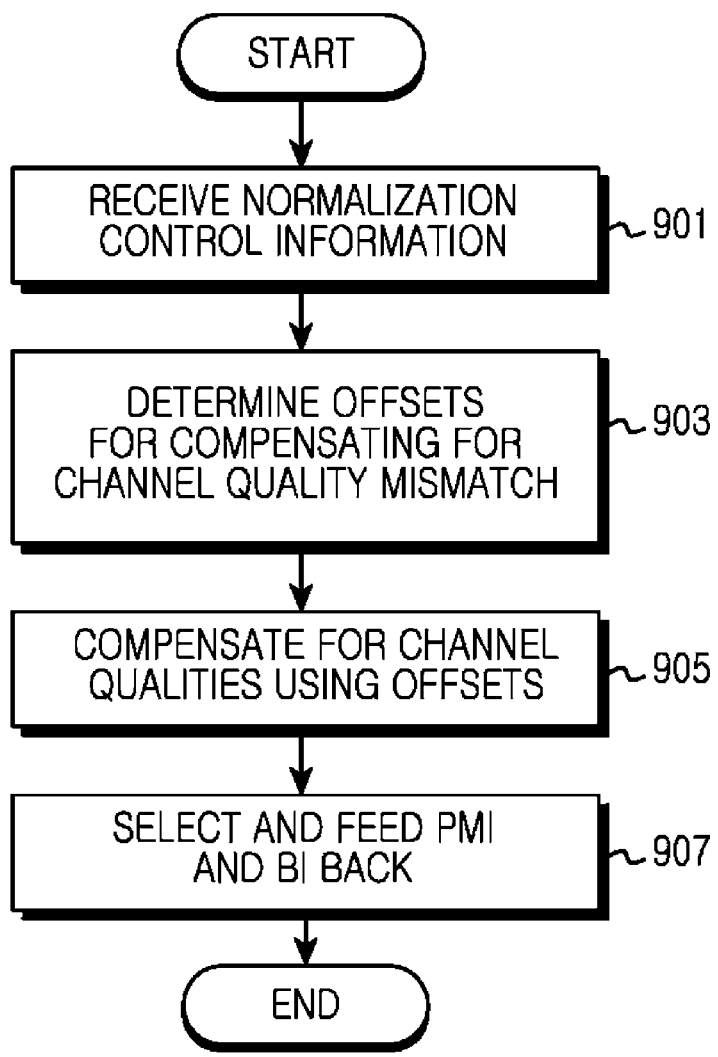
FIG. 9 illustrates operations of a receiver in a wireless communication system according to an embodiment of the present disclosure.

FIG. 9 illustrates operations of a receiver in a wireless communication system according to an embodiment of the present disclosure.

Referring to FIG. 9, at operation 901, the receiver receives the normalization control information. For example, the receiver receives the information for selecting the PMI and the BI free from the power excess, and the information for compensating for the channel quality mismatch caused by the normalization. The control information can include the analog transmit beam coefficients.

At operation 903, the receiver determines the offsets for compensating for the channel quality mismatch using the analog transmit beam coefficients. For example, the receiver predicts the beamforming result of the transmitter using the transmit beam coefficients, and calculates the amount of the transmission power which is increased or decreased by the normalization.

At operation 905, the receiver compensates for the channel qualities of the data transmission with the PMI and BI combination using the offsets. For example, the receiver determines the channel quality of the actual data transmission by adding or subtracting the offsets to or from the channel quality of the PMI and BI combinations based on the effective channel measured using the RS.

At operation 907, the receiver selects the PMI and the BI and feeds the selected PMI and BI back to the transmitter. The receiver selects the PMI and the BI free from the power excess, based on the control information. For example, the receiver can identify (e.g., determine) the PMI and BI combinations causing the power excess using the analog beam coefficients, exclude the PMI and BI combination causing the power excess, and then select the PMI and the BI for the transmitter. For example, the receiver can identify (e.g., determine) the PMI and BI combinations causing the power excess by predicting whether the transmission power input to the PA after the beamforming and the normalization of the PMI and BI combinations exceeds the power limit.

Although it is not illustrated in FIG. 9, the receiver can compensate for the CQI fed back to the transmitter, with the offset, and then feed the compensated CQI. Herein, the CQI can employ the channel quality value or the MCS level determined based on the channel quality.

With the feedforward information such as the feedback information of FIG. 7C, the transmitter operates as follows.

Figure 10:
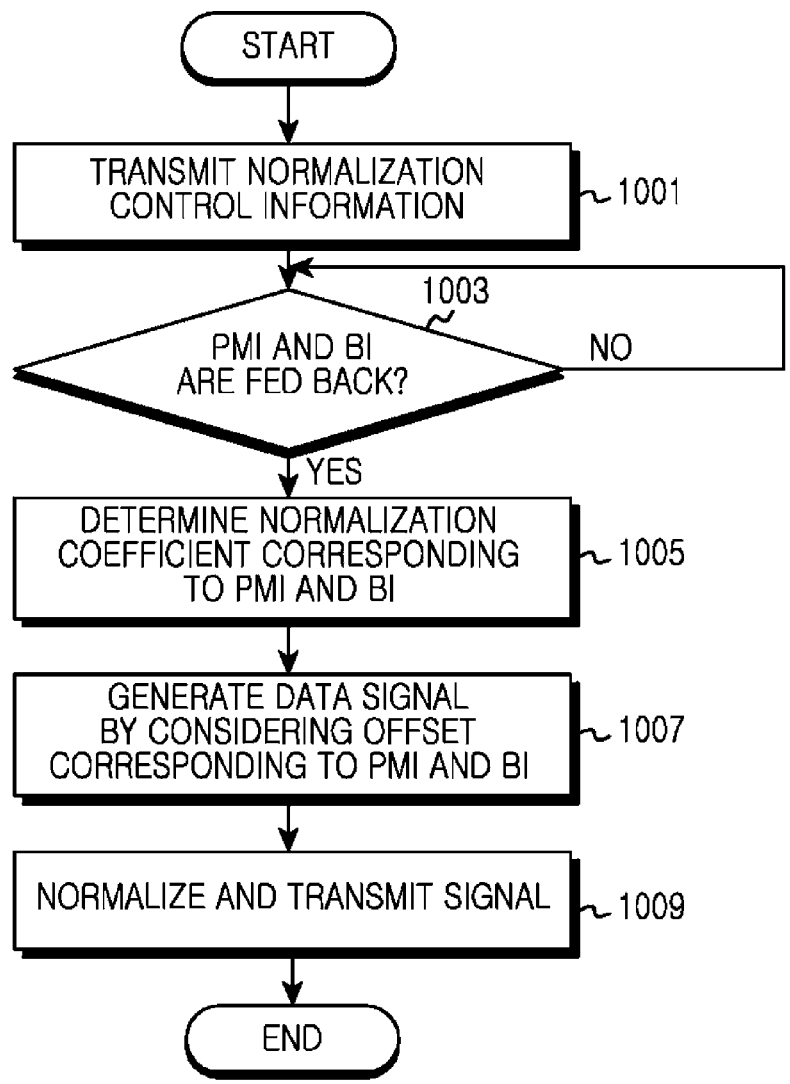
FIG. 10 illustrates operations of a transmitter in a wireless communication system according to an embodiment of the present disclosure.

FIG. 10 illustrates operations of a transmitter in a wireless communication system according to an embodiment of the present disclosure.

Referring to FIG. 10, at operation 1001, the transmitter transmits the normalization control information. For example, the transmitter feedforwards the information required for the receiver to select the PMI and the BI free from the power excess. The control information can include the PMI and BI combinations and the bitmap being the set of the flags indicating the power excess in the normalization of the PMI and BI combinations.

At operation 1003, the transmitter determines whether the PMI and the BI are fed back from the receiver. The fed PMI and BI are selected by the receiver based on the normalization control information, and used for the precoding and the analog beamforming of the data to transmit to the receiver.

If the transmitter determines that the PMI and the BI are not fed back at operation 1003, then the transmitter may continue to poll determining whether the PMI and the BI are fed back from the receiver.

If the transmitter determines that the PMI and the BI are fed back at operation 1003, then the transmitter may proceed to operation 1005 at which the transmitter determines the normalization coefficient corresponding to the PMI and the BI. For example, the transmitter stores the look-up table of the normalization coefficients corresponding to the combinations of the PMI and the BI. The transmitter can determine the normalization coefficient based on the look-up table. For example, the transmitter can calculate the normalization coefficient using the combination of the PMI and the BI according to the predefined rule.

At operation 1007, the transmitter generates the data signal by considering the offset corresponding to the PMI and the BI. More specifically, the transmitter identifies (e.g., determines) the offset corresponding to the PMI and the BI, compensates for the CQI of the receiver with the offset, determines the MCS level corresponding to the compensated CQI, and then encodes and modulates the data at the MCS level.

At operation 1009, the transmitter performs the normalization. For example, the transmitter normalizes the transmission power with the normalization coefficient. For example, the transmitter performs the digital beamforming using the PMI, performs the normalization by multiplying the transmit signal per chain by the normalization coefficient, and performs the analog beamforming using the BI. The transmitter may normalize and transmit the signal.

With the feedforward information such as, for example, the feedforward information of FIG. 7C, the receiver operates as follows.

The operations of the receiver are similar to the operations of FIG. 5. For example, the receiver receives the normalization control information including the PMI and BI combination and the bitmap being the set of the flags indicating the power excess when the combinations are normalized with the corresponding normalization coefficient. Based on the control information, the receiver selects the PMI and the BI free from the power excess.

Because the transmitter compensates for the CQI with the offset, the different MCS level from the CQI or the MCS level fed back from the receiver can be applied to a downlink data signal. In this case, the receiver demodulates and decodes the data signal at the MCS level notified over the downlink control channel.

Figure 11:
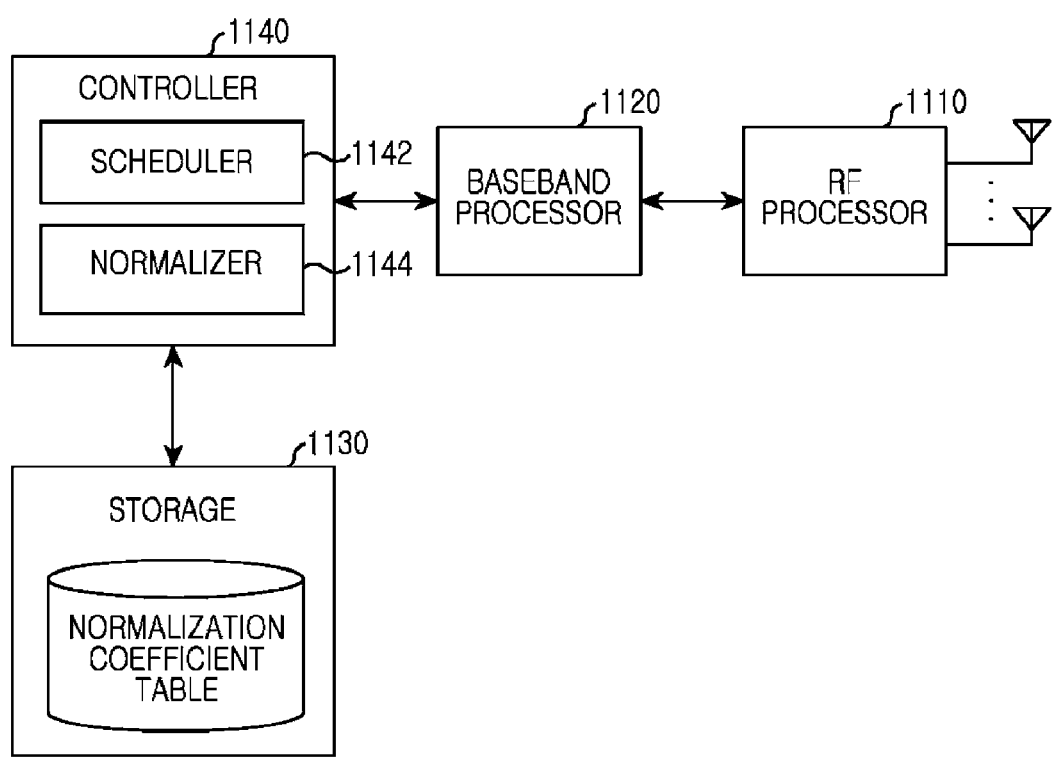
FIG. 11 illustrates a transmitter in a wireless communication system according to an embodiment of the present disclosure.

FIG. 11 is a block diagram of a transmitter in a wireless communication system according to an embodiment of the present disclosure.

Referring to FIG. 11, the transmitter includes an RF processor 1110, a baseband processor 1120, a storage 1130, and a controller 1140.

The RF processor 1110 transmits and receives signals over a radio channel through signal band conversion and amplification. For example, the RF processor 1110 upconverts a baseband signal fed from the baseband processor 1120 to an RF signal, transmits the RF signal over the antenna, and down-converts an RF signal received over the antenna to a baseband signal. For example, the RF processor 1110 can include a transmit filter, a receive filter, an amplifier, a mixer, an oscillator, a Digital to Analog Converter (DAC) and an Analog to Digital Converter (ADC). The RF processor 1110 can include the plurality of the RF chains as illustrated in FIG. 1.

The baseband processor 1120 converts the baseband signal and a bit stream according to a physical layer standard of the system. For example, for the data transmission, the baseband processor 1120 generates complex symbols by encoding and modulating the transmit bit stream. For the data reception, the baseband processor 1120 restores the received bit stream by demodulating and decoding the baseband signal fed from the RF processor 1110. For example, in the data transmission based on the OFDM, the baseband processor 1120 generates the complex symbols by encoding and modulating the transmit bit stream, maps the complex symbols to subcarriers, and generates OFDM symbols using the IFFT and Cyclic Prefix (CP) addition. For the data reception, the baseband processor 1120 splits the baseband signal fed from the RF processor 1110 to OFDM symbols, restores the signals mapped to the subcarriers using FFT, and restores the received bit stream by demodulating and decoding the signals.

The baseband processor 1120 normalizes the transmission power. An apparatus for the normalization can be constructed as shown in FIG. 12.

Figure 12:
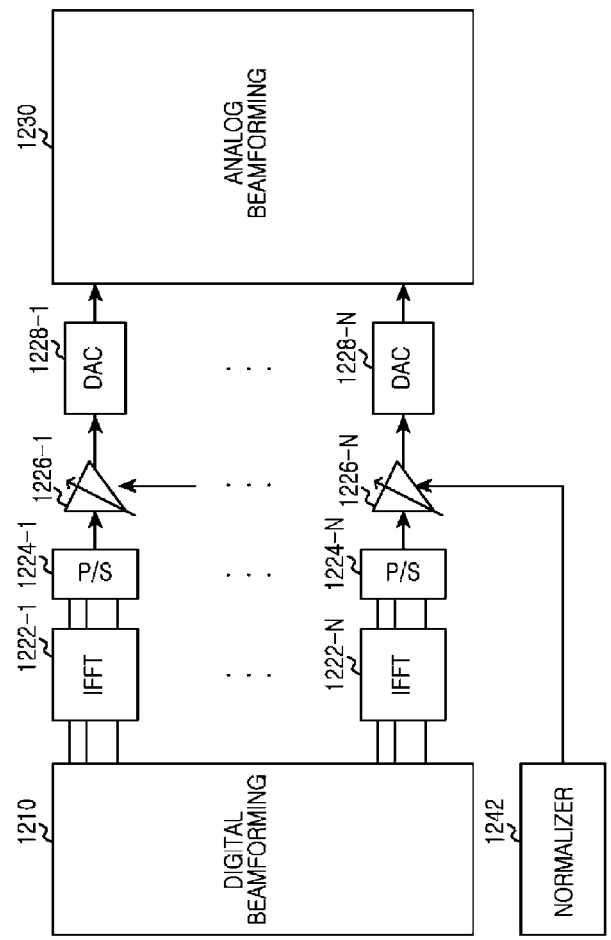
FIG. 12 illustrates an apparatus for a normalization in a wireless communication system according to an embodiment of the present disclosure.

FIG. 12 illustrates an apparatus for a normalization in a wireless communication system according to an embodiment of the present disclosure.

Referring to FIG. 12, the apparatus for a normalization may include a digital beamforming block 1210, an IFFT block 1222, a P/S block 1224, a gain controller 1226, a DAC block 1228, an analog beamforming block 1230, and a normalizer block 1242.

Referring to FIG. 12, signals digital-beamformed by a digital beamforming block 1210 (e.g., signals of the chains) are converted to time-domain signals by an IFFT block 1222 and a P/S block 1224. The signals of the chains are normalized by a gain controller 1226. In detail, the gain controller 1226 adjusts the signal level according to the normalization coefficient provided from a normalizer 1424. Next, the signal output from the gain controller 1226 is converted to an analog signal by a DAC 1228 and then analog-beamformed by an analog beamforming block 1230. Herein, the digital beamforming block 1210, the IFFT block 1222, the P/S block 1224, the gain controller 1226, and the DAC 1228 can be included in the baseband processor 1120, and the analog beamforming block 1230 can be included in the RF processor 1110.

The baseband processor 1120 and the RF processor 1110 transmit and receive the signals as stated above. Hence, the baseband processor 1120 and the RF processor 1110 can be referred to as a transmitter, a receiver, or a transceiver.

The storage 1130 stores a basic program for operating the transmitter, an application program, and data such as setting information. In particular, the storage 1130 stores the normalization coefficient table used to determine the normalization coefficient. The storage 1130 can store the offsets for compensating for the channel quality mismatch. The storage 1130 provides the stored data according to a request of the controller 1140.

The controller 1140 controls the operations of the transmitter. For example, the controller 1140 transmits and receives the signals through the baseband processor 1120 and the RF processor 1110. The controller 1140 includes a scheduler 1142 for determining the MIMO mode for sending the data to the receiver, determining the precoding matrix, and determining the analog beam, and a normalizer 1144 for controlling the normalization of the transmission power based on the MIMO mode. For example, the controller 1140 controls the transmitter to perform the method of FIG. 2, FIG. 5, or FIG. 10. The controller 1140 operates as below.

When the transmitter selects the BI and the PMI, the controller 1140 selects the MIMO mode for the signal transmission to the receiver and determines whether the selected MIMO mode is the single stream multi-beam transmission mode. When the selected MIMO mode is the single stream multi-beam transmission mode, the controller 1140 determines the normalization coefficient corresponding to the PMI and the BI. For example, the controller 1140 can determine the normalization coefficient by referring to the normalization coefficient table stored in the storage 1130. Next, the controller 1140 predictively calculates the transmission power value per antenna element after the normalization prior to the actual signal transmission, and compares the predicted transmission power value with the power limit. When the transmission power value predicted for at least one antenna element exceeds the power limit, the controller 1140 enters the default MIMO mode and then transmits the signal. By contrast, when the transmission power value predicted for at least one antenna element does not exceed the power limit, the controller 1140 controls the baseband processor 1120 and the RF processor 1130 to perform the digital beamforming with the PMI, to normalize the transmission power by multiplying the transmit signal per chain by the normalization coefficient, and to perform the analog beamforming with the BI.

Alternatively, the receiver selects the BI and the PMI. The controller 1140 feed-forwards the information required for the receiver to select the PMI and the BI free from the power excess, through the baseband processor 1120 and the RF processor 1130. The control information can include the PMI and BI combination, and the bitmap being the set of the flags indicating the power excess in the normalization of the PMI and BI combinations with the corresponding normalization coefficient. Alternatively, the control information can include the analog beam coefficient of the analog beams. Next, when receiving the PMI and the BI from the receiver, the controller 1140 determines the normalization coefficient corresponding to the PMI and the BI. The controller 1140 controls the baseband processor 1120 and the RF processor 1130 to perform the digital beamforming with the PMI, to normalize the transmission power by multiplying the transmit signal per chain by the normalization coefficient, and to perform the analog beamforming with the BI.

Alternatively, the receiver selects the BI and the PMI, and the transmitter compensates for the channel quality mismatch. The controller 1140 feedforwards the information required for the receiver to select the PMI and the BI free from the power excess, through the baseband processor 1120 and the RF processor 1130. The control information can include the PMI and BI combination, and the bitmap being the set of the flags indicating the power excess in the normalization of the PMI and BI combinations with the corresponding normalization coefficient. Next, when receiving the PMI and the BI from the receiver, the controller 1140 determines the normalization coefficient corresponding to the PMI and the BI. The controller 1140 identifies (e.g., determines) the offset corresponding to the PMI and the BI, compensates for the CQI of the receiver using the offset, determines the MCS level corresponding to the compensated CQI, and then controls the baseband processor 1120 to encode and modulate the data at the MCS level. Next, the controller 1140 controls the baseband processor 1120 and the RF processor 1130 to perform the digital beamforming with the PMI, to normalize the transmission power by multiplying the transmit signal per chain by the normalization coefficient, and to perform the analog beamforming with the BI.

Figure 13:
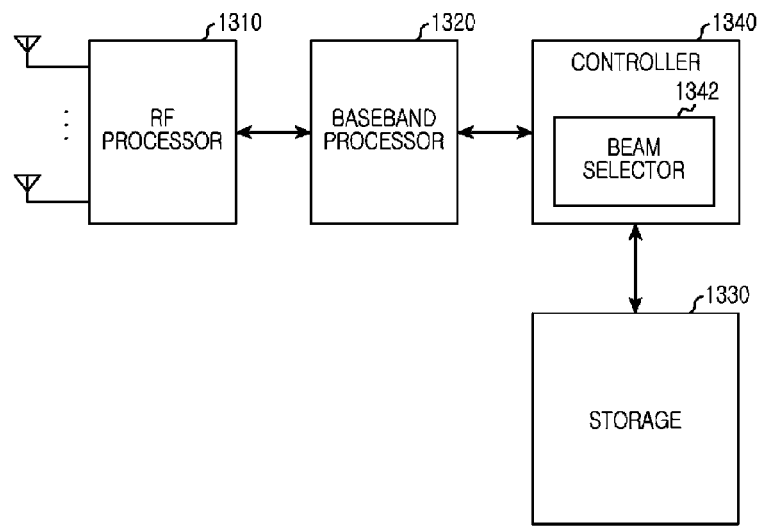
FIG. 13 illustrates a receiver in a wireless communication system according to an embodiment of the present disclosure.

FIG. 13 is a block diagram of a receiver in the wireless communication system according to an embodiment of the present disclosure.

Referring to FIG. 13, the receiver includes an RF processor 1310, a baseband processor 1320, a storage 1330, and a controller 1340.

The RF processor 1310 transmits and receives signals over the radio channel through the signal band conversion and amplification. For example, the RF processor 1110 upconverts the baseband signal fed from the baseband processor 1320 to the RF signal, transmits the RF signal over the antenna, and down-converts the RF signal received over the antenna to the baseband signal. For example, the RF processor 1310 can include a transmit filter, a receive filter, an amplifier, a mixer, an oscillator, a DAC, an ADC, and/or the like. The RF processor 1310 can include the plurality of the RF chains as illustrated in FIG. 1.

The baseband processor 1320 converts the baseband signal and the bit stream according to the physical layer standard of the system. For example, for the data transmission, the baseband processor 1320 generates the complex symbols by encoding and modulating the transmit bit stream. For the data reception, the baseband processor 1320 restores the received bit stream by demodulating and decoding the baseband signal fed from the RF processor 1310. For example, in the data transmission based on the OFDM, the baseband processor 1320 generates the complex symbols by encoding and modulating the transmit bit stream, maps the complex symbols to sub-carriers, and generates OFDM symbols using the IFFT and the CP addition. For the data reception, the baseband processor 1320 splits the baseband signal fed from the RF processor 1310 to the OFDM symbols, restores the signals mapped to the subcarriers using the FFT, and restores the received bit stream by demodulating and decoding the signals.

The baseband processor 1320 and the RF processor 1310 transmit and receive the signals as stated above. Hence, the baseband processor 1320 and the RF processor 1310 can be referred to as a transmitter, a receiver, or a transceiver.

The storage 1330 stores a basic program for operating the receiver, an application program, and data such as setting information. The storage 1330 provides the stored data according to a request of the controller 1340.

The controller 1340 controls the operations of the receiver. For example, the transmitter 1340 transmits and receives the signals through the baseband processor 1320 and the RF processor 1310. The controller 1340 includes a beam selector 1342 for selecting the PMI designating the preceding matrix and the BI designating the analog beam for the data transmission of the receiver. For example, the controller 1340 controls the receiver to perform the method of FIG. 6, FIG. 8, or FIG. 9. The controller 1340 operates as below.

The controller 1340 receives the normalization control information from the transmitter through the RF processor 1310 and the baseband processor 1320. The control information can include the PMI and BI combination, and the bitmap being the set of the flags indicating the power excess in the normalization of the PMI and BI combinations with the corresponding normalization coefficient. Alternatively, the control information can include the analog beam coefficients of the analog beams. After receiving the control information, the controller 1340 selects the PMI and BI free from the power excess based on the control information, and feeds the selected PMI and BI back to the transmitter through the baseband processor 1320 and the RF processor 1310. For example, the controller 1340 can exclude the PMI and BI combination corresponding to the flag causing the power excess, and then select the PMI and the BI for the transmitter. For example, the controller 1340 can identify (e.g., determine) the PMI and BI combinations causing the power excess using the normalization coefficients and the beam coefficients, exclude the PMI and BI combination causing the power excess, and then select the PMI and the BI for the transmitter.

Alternatively, the receiver compensates for the channel quality mismatch but receives the offset from the transmitter. The controller 1340 receives the normalization control information from the transmitter through the RF processor 1310 and the baseband processor 1320. The control information can include the PMI and BI combination, the bitmap being the set of the flags indicating the power excess in the normalization of the PMI and BI combinations with the corresponding normalization coefficient, and the offsets for compensating for the channel quality mismatch. After receiving the control information, the controller 1340 compensates for the channel qualities of the data transmission using the PMI and BI combinations with the offsets. The controller 1340 selects the PMI and BI free from the power excess based on the control information, and feeds the selected PMI and BI back to the transmitter through the baseband processor 1320 and the RF processor 1310. For example, the controller 1340 can exclude the PMI and BI combination corresponding to the flag causing the power excess, and then select the PMI and the BI for the transmitter. For example, the controller 1340 can identify (e.g., determine) the PMI and BI combinations causing the power excess using the normalization coefficients and the beam coefficients, exclude the PMI and BI combination causing the power excess, and then select the PMI and the BI for the transmitter.

Alternatively, the receiver compensates for the channel quality mismatch but receives the offset from the transmitter. The controller 1340 receives the normalization control information from the transmitter through the RF processor 1310 and the baseband processor 1320. Alternatively, the control information can include the analog beam co-efficients of the analog beams. After receiving the control information, the controller 1340 determines the offsets for compensating for the channel quality mismatch using the analog transmit beam coefficients, and compensates for the channel qualities of the data transmission of the PMI and BI combinations with the offsets. The controller 1340 selects the PMI and BI free from the power excess based on the control information, and feeds the selected PMI and BI back to the transmitter through the baseband processor 1320 and the RF processor 1310. For example, the controller 1340 can exclude the PMI and BI combination corresponding to the flag causing the power excess, and then select the PMI and the BI for the transmitter. For example, the controller 1340 can identify (e.g., determine) the PMI and BI combinations causing the power excess using the normalization coefficients and the beam coefficients, exclude the PMI and BI combination causing the power excess, and then select the PMI and the BI for the transmitter 310.

The methods described in the claims and/or the specification of the present disclosure can be implemented using hardware and software alone or in combination.

As for the software, a non-transitory computer-readable storage medium including one or more programs (software modules) can be provided. One or more programs stored to the non-transitory computer-readable storage medium are configured for execution of one or more processors of an electronic device. One or more programs include instructions making the electronic device execute the methods according to the various embodiments as described in the claims and/or the specification of the present disclosure.

The program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, a magnetic cassette, and/or the like. Alternatively, the program can be stored to a memory combining part or all of those recording media. A plurality of memories may be equipped.

The program can be stored to an attachable storage device of the electronic device accessible via the communication network such as Internet, Intranet, Local Area Network (LAN), Wide LAN (WLAN), or Storage Area Network (SAN), or a communication network combining the networks. The storage device can access the electronic device through an external port. A separate storage device in the communication network can access the portable electronic device.

As set forth above, the normalization is selectively implemented based on the MIMO mode in the wireless communication system. Therefore, the relatively considerable back-off in a particular MIMO mode can be reduced and the PA efficiency of the whole system can be enhanced.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for operating a transmitter in a wireless communication system, the method comprising:
transmitting control information on transmission power normalization;
receiving information indicating a precoding matrix and an analog beam selected based on the control information; and
transmitting a signal normalized using a normalization coefficient corresponding to a combination of the precoding matrix and the analog beam,
wherein the control information comprises information for determining the combination of the precoding matrix and the analog beam for which a transmission power of at least one antenna element exceeds a limit.

2. The method of claim 1, further comprising:
determining a Modulation and Coding Scheme (MCS) level to apply to data to be transmitted to a receiver, using an offset corresponding to the combination of the precoding matrix and the analog beam.

3. The method of claim 1, further comprising:
determining the normalization coefficient corresponding to the combination of the precoding matrix and the analog beam, in a look-up table.

4. The method of claim 1, wherein the transmitting of the normalized signal comprises:
performing a digital beamforming using the precoding matrix;
performing the normalization by multiplying transmit signal per chain by the normalization coefficient corresponding to the combination of the precoding matrix and the analog beam; and
performing an analog beamforming using the analog beam.

5. The method of claim 1, further comprising:
normalizing the signal based on the control information;
determining whether a power value of at least one antenna exceeds the limit for the normalized signal; and
in response to determining that the power value of at least one antenna exceeds the limit for the normalized signal, normalizing and transmitting the signal.

6. The method of claim 5, further comprising:
in response to determining that the power value of any antenna exceeds the limit for the normalized signal, entering a default Multi-Input Multi-Output mode and transmitting the signal.

7. A method for operating a receiver in a wireless communication system, the method comprising:
receiving control information on transmission power normalization; and
transmitting information indicating a precoding matrix and an analog beam selected based on the control information,
wherein the control information comprises information for determining the combination of the precoding and the analog beam for which a transmission power of at least one antenna element exceeds a limit.

8. The method of claim 7, further comprising:
selecting a combination among other combinations than the precoding matrix and analog beam combinations corresponding to flags indicating excess of the transmission power over the limit.

9. The method of claim 8, further comprising:
compensating for a channel quality with the offset when transmitting data using the selected combination.

10. The method of claim 7, wherein the control information comprises analog beam coefficients used by a transmitter, further comprising:
determining at least one combination of the transmission power exceeding the limit, using the analog beam coefficients; and
selecting one combination among one or more combinations other than the at least one determined combination.

11. An apparatus of a transmitter supporting digital beamforming and analog beamforming in a wireless communication system, the apparatus comprising:
a transmitting part configured to transmit control information on transmission power normalization; and
a receiving part configured to receive information indicating a precoding matrix and an analog beam selected based on the control information,
wherein the transmitting part is further configured to transmit a signal normalized using a normalization coefficient corresponding a combination of the precoding matrix and the analog beam, and
wherein the control information comprises information for determining the combination of the precoding and the analog beam where a transmission power of at least one antenna element exceeds a limit.

12. The apparatus of claim 11, further comprising a controller configured to determine a Modulation and Coding Scheme (MCS) level to apply to data to be transmitted to a receiver, using the offset corresponding to the combination of the precoding matrix and the analog beam.

13. The apparatus of claim 11, further comprising a controller configured to determine the normalization coefficient corresponding to the combination of the precoding matrix and the analog beam, in a predefined look-up table.

14. The apparatus of claim 11, wherein the transmitting part is further configured to:
perform a digital beamforming using the precoding matrix,
perform the normalization by multiplying transmit signal per chain by the normalization coefficient corresponding to the combination of the precoding matrix and the analog beam, and
perform the analog beamforming using an analog beam coefficient.

15. The apparatus of claim 11, further comprising a controller configured to:
normalize the signal based on the control information,
determine whether a power value of at least one antenna exceeds the limit for the normalized signal, and
in response to determining that the power value of at least one antenna exceeds the limit for the normalized signal, normalize the signal,
wherein the transmitting part is further configured to transmit the signal.

16. The apparatus of claim 15, wherein the controller is further configured to, in response to determining that the power value of any antenna exceeds the limit for the normalized signal, enter a default Multi-Input Multi-Output mode,
wherein the transmitting part is further configured to transmit the signal.

17. An apparatus of a receiver in a wireless communication system, the apparatus comprising:
a receiving part configured to receive control information on transmission power normalization; and a transmitting part configured to transmit information indicating a precoding matrix and an analog beam selected based on the control information, wherein the control information comprises information for determining the combination of the precoding and the analog beam where a transmission power of at least one antenna element exceeds a limit.

18. The apparatus of claim 17, further comprising a controller configured to select a combination among other combinations than the precoding matrix and analog beam combinations corresponding to flags indicating excess of the transmission power over a limit.

19. The apparatus of claim 18, wherein the controller is further configured to compensate for a channel quality with the offset when transmitting data using the selected combination.

20. The apparatus of claim 17, wherein the control information comprises analog beam coefficients used by a transmitter, the apparatus further comprising a controller configured to:

determine at least one combination of the transmission power exceeding the limit, using the analog beam coefficients, and select one combination among one or more combinations other than the at least one determined combination.

* * * * *